US010298895B1

(12) United States Patent
Ramachandra et al.

(10) Patent No.: US 10,298,895 B1
(45) Date of Patent: May 21, 2019

(54) METHOD AND SYSTEM FOR PERFORMING CONTEXT-BASED TRANSFORMATION OF A VIDEO

(71) Applicant: Wipro Limited, Bangalore (IN)

(72) Inventors: Manjunath Ramachandra, Bangalore (IN); Sethuraman Ulaganathan, Tiruchirapalli (IN)

(73) Assignee: Wipro Limited, Bangalore (IN)

(*) Notice: Subject to any disclaimer, the term of this patent is extended or adjusted under 35 U.S.C. 154(b) by 0 days.

(21) Appl. No.: 15/941,221

(22) Filed: Mar. 30, 2018

(30) Foreign Application Priority Data

Feb. 15, 2018 (IN) .............................. 201841005827

(51) Int. Cl.
*H04N 7/18* (2006.01)
*H04N 9/43* (2006.01)
*G10L 15/26* (2006.01)
*G06K 9/00* (2006.01)

(52) U.S. Cl.
CPC ........... *H04N 9/43* (2013.01); *G06K 9/00523* (2013.01); *G06K 9/00751* (2013.01); *G10L 15/265* (2013.01)

(58) Field of Classification Search
CPC .. H04N 9/43; G06K 9/00751; G06K 9/00523; G10L 15/265
USPC .......................................................... 348/34
See application file for complete search history.

(56) References Cited

U.S. PATENT DOCUMENTS

| | | | | |
|---|---|---|---|---|
| 8,755,837 B2* | 6/2014 | Rhoads | ................ | G06K 9/6253 455/556.1 |
| 8,902,988 B2* | 12/2014 | Sole Rojals | ......... | H04N 19/176 375/240.18 |
| 2002/0035726 A1* | 3/2002 | Corl | ..................... | H04N 5/4401 725/39 |
| 2005/0076028 A1* | 4/2005 | Kimura | ................ | H04N 21/235 |
| 2005/0123284 A1* | 6/2005 | Kikuchi | ............... | G11B 27/034 386/240 |
| 2005/0204385 A1* | 9/2005 | Sull | ...................... | G11B 27/034 725/45 |

(Continued)

OTHER PUBLICATIONS

Ze-Nian et al, Locale-based object search under illumination change using chromatticity voting and elastic correlation (Year: 2000).*

(Continued)

*Primary Examiner* — Shan E Elahi
(74) *Attorney, Agent, or Firm* — Pepper Hamilton LLP

(57) ABSTRACT

Disclosed herein is a method and system for performing context-based transformation of a video. In an embodiment, a scene descriptor and a textual descriptor are generated for each scene corresponding to the video. Further, an audio context descriptor is generated based on semantic analysis of the textual descriptor. Subsequently, the audio context descriptor and the scene descriptor are correlated to generate a scene context descriptor for each scene. Finally, the video is translated using the scene context descriptor, thereby transforming the video based on context. In some embodiments, the method of present disclosure is capable of automatically changing one or more attributes, such as color of one or more scenes in the video, in response to change in the context of audio/speech signals corresponding to the video. Thus, the present method helps in effective rendering of a video to users.

15 Claims, 6 Drawing Sheets

(56) References Cited

U.S. PATENT DOCUMENTS

| | | | |
|---|---|---|---|
| 2006/0136259 A1* | 6/2006 | Weiner | G06Q 10/10 705/2 |
| 2007/0036223 A1* | 2/2007 | Srinivasan | H03M 7/46 375/240.18 |
| 2007/0067797 A1* | 3/2007 | Lee | H04N 7/165 725/35 |
| 2009/0043786 A1* | 2/2009 | Schmidt | G06F 16/48 |
| 2009/0199235 A1 | 8/2009 | Surendran et al. | |
| 2010/0223223 A1* | 9/2010 | Sandler | G06F 16/68 706/50 |
| 2011/0075851 A1* | 3/2011 | LeBoeuf | H04R 29/00 381/56 |
| 2013/0182772 A1* | 7/2013 | Seregin | H04N 19/13 375/240.18 |
| 2013/0230097 A1* | 9/2013 | Sole Rojals | H04N 19/13 375/240.02 |
| 2013/0259141 A1* | 10/2013 | Van der Auwera | H04N 19/117 375/240.29 |
| 2013/0272381 A1* | 10/2013 | Guo | H04N 19/96 375/240.02 |
| 2015/0016536 A1* | 1/2015 | Hsieh | H04N 19/61 375/240.18 |
| 2015/0016550 A1* | 1/2015 | Kim | H04N 19/80 375/240.29 |
| 2015/0143410 A1* | 5/2015 | Byers | H04N 21/812 725/34 |
| 2015/0279080 A1* | 10/2015 | Landers | H04N 21/812 345/473 |
| 2016/0196084 A1* | 7/2016 | Hsi | G06F 3/0625 711/112 |
| 2016/0254028 A1 | 9/2016 | Atkins et al. | |

OTHER PUBLICATIONS

Koo, "Automatic Colorization With Deep Convolutional Generative Adversarial Networks," Stanford University (2016) Retrieved from the Internet: <http://cs231n.stanfort.edu/reports/2016/pdfs/224_Report.pdf>, (last accessed Mar. 26, 2018).

* cited by examiner

METHOD AND SYSTEM FOR PERFORMING CONTEXT-BASED TRANSFORMATION OF A VIDEO

This application claims the benefit of Indian Patent Application Serial No. 201841005827 filed Feb. 15, 2018, which is hereby incorporated by reference in its entirety.

FIELD

The present subject matter is, in general, related to video processing and more particularly, but not exclusively, to a method and system for performing context-based transformation of a video.

BACKGROUND

There exist various video translation techniques for translating a video from one form to another, for example, one color tone to another color tone. However, most of the existing techniques use semi-automatic methods, requiring manual interactions. Of late, developments in artificial intelligence domain have paved way for implementing techniques in various systems, specifically trained systems, for complete automatic translation of a black-and-white video into a color video. However, such systems, for performing expected video translation, require intense training with various scenes/scenarios associated with different environments, objects, attributes, and actions along with the different possible colors of the scenes.

Further, there may be instances where an audio or speech content in the video refers to background or other coloring aspects of the video. For example, suppose one of the characters in the video utters a sentence such as—"the sky is Blue!", looking at the sky. In such instances, although the scene lasts for only a few seconds in the video, the color of sky in the background of the scene is expected to have blue color, a little before and after the scene. However, most of the conventional video translation techniques transform the video without considering these necessities/contexts.

Also, most of the existing techniques, involve rigorous training process for generating metadata of the video, which is required for translating the video. However, such methods do not consider the audio and/or speech contents in the video, and hence fail to correlate between the audio and visual segments of the video. As a consequence, such systems fail to effectively perform translation of the video.

The information disclosed in this background of the disclosure section is only for enhancement of understanding of the general background of the invention and should not be taken as an acknowledgement or any form of suggestion that this information forms the prior art already known to a person skilled in the art.

SUMMARY

One or more shortcomings of the prior art may be overcome, and additional advantages may be provided through the present disclosure. Additional features and advantages may be realized through the techniques of the present disclosure. Other embodiments and aspects of the disclosure are described in detail herein and are considered a part of the claimed disclosure.

Disclosed herein is a method for performing context-based transformation of a video. The method comprises generating, by a video transformation system, a scene descriptor for each of one or more scenes corresponding to the video. Further, the method comprises generating a textual descriptor for each of one or more speech segments related to the one or more scenes. Upon generating the textual descriptor, the method comprises determining an audio context descriptor based on semantic analysis of the textual descriptor of each of the one or more speech segments. Further, the method comprises correlating the audio context descriptor with the scene descriptor for generating a scene context descriptor for each of the one or more scenes. Finally, the method comprises translating each of the one or more scenes using the scene context descriptor for transforming the video.

Further, the present disclosure relates to a video transformation system for performing context-based transformation of a video. The video transformation system comprises a processor and a memory. The memory is communicatively coupled to the processor and stores processor-executable instructions, which on execution, cause the processor to generate a scene descriptor for each of one or more scenes corresponding to the video. Further, the instructions cause the processor to generate a textual descriptor for each of one or more speech segments related to the one or more scenes. Upon generating the textual descriptor, the instructions cause the processor to determine an audio context descriptor based on semantic analysis of the textual descriptor of each of the one or more speech segments. Further, the instructions cause the processor to correlate the audio context descriptor with the scene descriptor to generate a scene context descriptor for each of the one or more scenes. Finally, the instructions cause the processor to translate each of the one or more scenes using the scene context descriptor to transform the video.

Furthermore, the present disclosure relates to a non-transitory computer readable medium including instructions stored thereon that when processed by at least one processor cause a video transformation system to perform operations comprising generating a scene descriptor for each of one or more scenes corresponding to the video. Upon generating the scene descriptor, the instructions cause the video transformation system to generate a textual descriptor for each of one or more speech segments related to the one or more scenes. Further, the instructions cause the video transformation system to determine an audio context descriptor based on semantic analysis of the textual descriptor of each of the one or more speech segments. Upon determining the audio context descriptor, the instructions cause the video transformation system to correlate the audio context descriptor with the scene descriptor for generating a scene context descriptor for each of the one or more scenes. Finally, the instructions cause the video transformation system to translate each of the one or more scenes using the scene context descriptor for transforming the video.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

Figure 1:
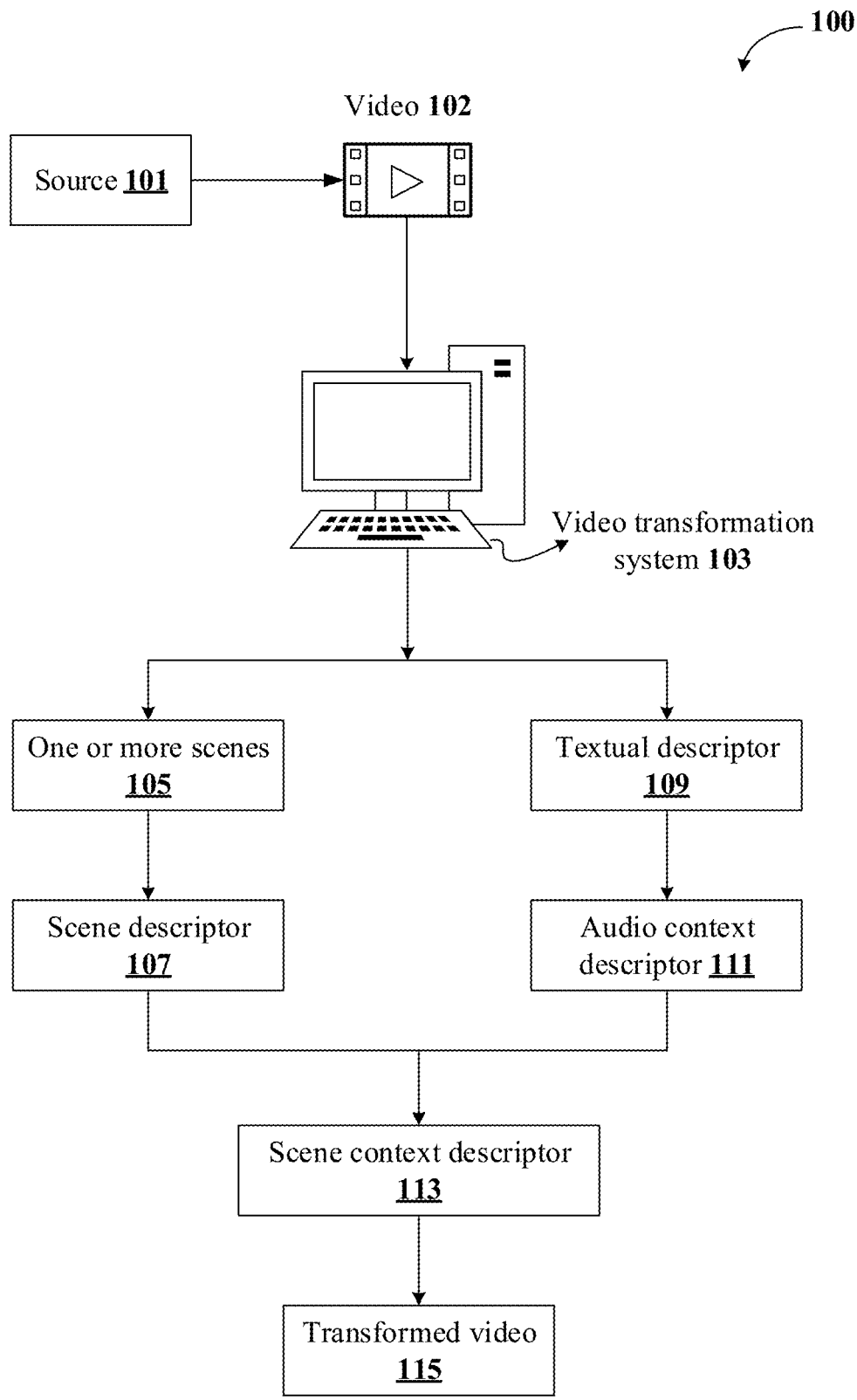
FIG. 1 illustrates an exemplary environment for performing context-based transformation of a video in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the specific forms disclosed, but on the contrary, the disclosure is to cover all modifications, equivalents, and alternative falling within the spirit and the scope of the disclosure.

The terms "comprises", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure relates to a method and a video transformation system for performing context-based transformation of a video. In an embodiment, the method of present disclosure may identify various non-redundant frames in a video and generate scene descriptors for the non-redundant frames. Also, the method may include generating audio descriptors for audio signals in the video, from which textual descriptors may be generated. The textual descriptors may be semantically analyzed to generate audio context descriptors, which help in identifying context-based elements, such as color of a scene in the video. Further, the generated scene descriptors and the textual descriptors may be correlated to generate a scene context descriptor for each of the scenes in the video. Finally, information in the scene context descriptor may be used for translating the video.

Furthermore, according to embodiments of the present disclosure, a portion of the video may be dynamically transformed based on a change in audio portion of the video. In other words, for an input video, the video transformation system provides a mechanism to contextually translate and/or convert the attributes (such as color of the scenes), and the sequence of rendering the video to the user. This feature may be advantageous in various application, for example, during a product demo, an educative presentation, or even a corporate presentation, wherein the video/a pre-recorded presentation being presented by the presenter has to be rendered according to the explanation provided by the presenter.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 illustrates an exemplary environment 100 for performing context-based transformation of a video 102 in accordance with some embodiments of the present disclosure.

In some implementations, the environment 100 may include a video transformation system 103, which may be configured to perform a context-based transformation of a video 102 received from a source 101. In an embodiment, the video transformation system 103 may be, without limitation, a desktop computer, a laptop, a smartphone or any other computing device capable of performing transformation of the video 102. In an alternative implementation, the video transformation system 103 may be configured on a remote cloud computing platform. In such implementations, the user may access the video transformation system 103 using an Application Programming Interface (API), for example a web application, provided by the video transformation system 103.

In an embodiment, the source 101 may include, without limiting to, a video capturing device and/or a smartphone used for capturing the video 102 of a scene, a computer/laptop or any computing device having stored the video 102, or a storage unit storing pre-recorded videos of various scenes. Further, the video 102 may be any audio-visual content such as, without limitation, a cinema, a content captured by a video capturing device, a recorded product demo or a recorded slide show presentation. Further, the video 102 may be of any size, any length (in terms of total runtime) and any color combination.

In an embodiment, upon receiving the video 102, the video transformation system 103 may process the video 102 for extracting one or more scenes 105 from the video 102. As an example, the one or more scenes 105 may correspond to one or more image frames contained in the video 102. Further, upon extracting the one or more scenes 105 from the video 102, the video transformation system 103 may generate a scene descriptor 107 for each of the one or more scenes 105. In an embodiment, the scene descriptor 107 may be generated using one or more parameters including, without limitation, objects present in the one or more scenes 105, actions performed by the objects, and attributes of background of the objects in the one or more scenes 105.

In an embodiment, the video transformation system 103 may analyze audio signals in the video 102 to identify one or more speech segments related to the one or more scenes 105 in the video 102. Further, the video transformation system 103 may convert each of the one or more speech segments into corresponding text segments for generating a textual descriptor 109 for each of the one or more speech segments. Subsequently, the video transformation system 103 may perform a semantic analysis of the textual descriptor 109 of each of the one or more speech segments to determine an audio context descriptor 111. As an example, the audio context descriptor 111 may indicate context of the one or more speech segments with respect to sequence of the one or more scenes 105 in the video 102.

In an embodiment, the process of generating the scene descriptor 107 and the audio context descriptor 111 may be performed concurrently by the video transformation system 103. Upon generating the scene descriptor 107 and the audio context descriptor 111, the video transformation system 103 may correlate the audio context descriptor 111 with the scene descriptor 107 for generating a scene context descriptor 113 for each of the one or more scenes 105. As an example, the scene context descriptor 113 may indicate one or more changes that must be performed on the one or more scenes 105, for transforming the video 102 in accordance with the audio context descriptor 111. Suppose, if the audio context descriptor 111 indicates a condition such as—'Sunny day', then the corresponding scene context descriptor 113 may suggest that the color of sky in the one or more scenes 105 must be changed to Blue, since it is general notion that Blue sky represents a clear, sunny day.

Finally, the video transformation system 103 may translate each of the one or more scenes 105 using the scene context descriptor 113 for transforming the video 102. The transformed video 115 may be rendered to the user through a user interface of the video transformation system 103.

Figure 2:
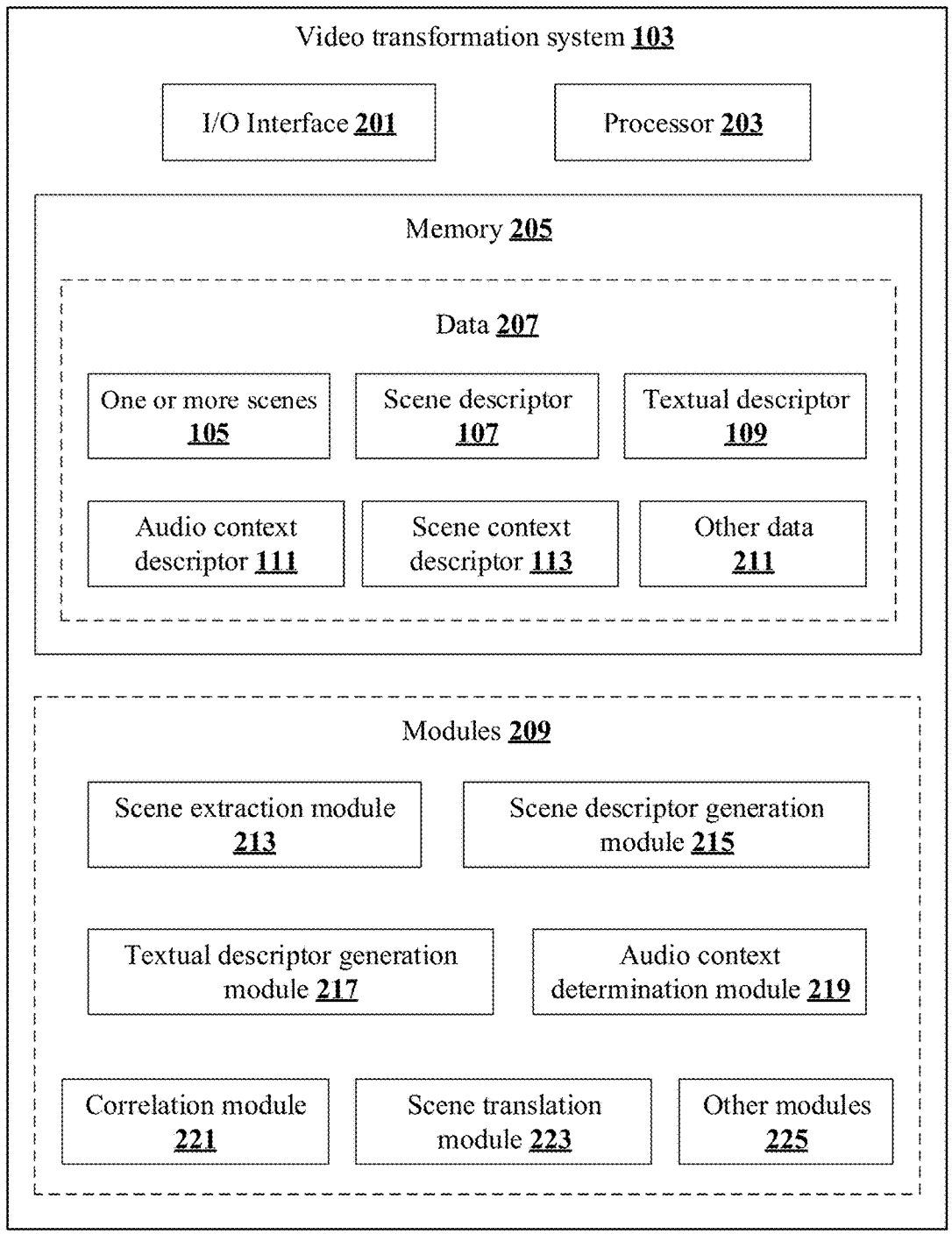
FIG. 2 shows a detailed block diagram illustrating a video transformation system in accordance with some embodiments of the present disclosure.

FIG. 2 shows a detailed block diagram illustrating a video transformation system 103 in accordance with some embodiments of the present disclosure.

In an implementation, the video transformation system 103 may include an I/O interface 201, a processor 203, and a memory 205. The I/O interface 201 may be configured to communicate with a user and/or an external computing device for receiving a video 102 to be transformed. Further, the I/O interface 201 may be configured for rendering the transformed video 115 to the user. The memory 205 may be communicatively coupled to the processor 203. The processor 203 may be configured to perform one or more functions of the video transformation system 103 while transforming the video 102.

In some implementations, the video transformation system 103 may include data 207 and modules 209 for performing various operations in accordance with embodiments of the present disclosure. In an embodiment, the data 207 may be stored within the memory 205 and may include information related to, without limiting to, one or more scenes 105, a scene descriptor 107, a textual descriptor 109, an audio context descriptor 111, a scene context descriptor 113, and other data 211.

In some embodiments, the data 207 may be stored within the memory 205 in the form of various data structures. Additionally, the data 207 may be organized using data models, such as relational or hierarchical data models. The other data 211 may store data, including the video 102, the transformed video 115 and other temporary data and files generated by one or more modules 209 for performing various functions of the video transformation system 103.

In an embodiment, the one or more scenes may be extracted from the video 102. Further, the scene descriptor 107 may be generated for each of the one or more scenes 105 corresponding to the video 102. In an embodiment, the scene descriptor 107 may be generated using one or more parameters including, without limitation, objects present in the one or more scenes 105, actions performed by the objects, and attributes of background of the objects in the one or more scenes 105. As an example, the scene descriptor 107 may include, without limitation, a label for each object present in the one or more scenes 105, and description of each object present in the one or more scenes 105. The label of an object may be a unique identifier assigned to the object. And, the description of the object may be an illustration of various characteristics of the object.

For example, consider a scene of a 'Highway'. Here, the scene may have various objects such as the road, trees alongside the road, vehicles moving on the road and the like. The scene descriptor 107 generated for the aforesaid scene may include labels (i.e. names) of all the objects present in the scene, and descriptions related to each object present in the scene, as indicated below:

Scene descriptor for the 'Highway' scene:
Object: Road; Attributes—color: black;
Object: Trees;
Tree 1→Attributes—color of leaves: Green; Height: Tall; Distance from highway: Close;
Tree 2→Attributes—color of leaves: Green; Height: Short; Distance from highway: Far;
Object: Vehicles;
Vehicle 1→Attributes—color: White; Type: Car;
Vehicle 2→Attributes—color: Brown; Type: Truck;

In an embodiment, the textual descriptor 109 of the one or more scenes 105 may be generated based on one or more speech segments related to the one or more scenes 105. The one or more speech segments may be obtained by processing the video 102 to extract one or more audio signals, and then segregating the one or more audio signals into one or more speech segments and one or more non-speech segments. Further, the one or more non-speech segments may be eliminated from further processing, since the one or more non-speech segments do not help in determining context of the one or more audio signals. In an embodiment, the textual descriptor 109 may be generated by translating each of the one or more speech segments into corresponding text segments using a predetermined speech-to-text conversion technique.

In an embodiment, the audio context descriptor 111 may be determined based on semantic analysis of the textual descriptor 109 of each of the one or more speech segments. For example, suppose one of the speech segment in the video 102 is—'The sky is clear'. Here, the audio context descriptor 111 generated for the above speech segment may include information related to various attributes of the object 'Sky', such as color of the sky, intensity and visibility of the sky and the like.

For example, consider a scene representing the sky. Here, the attributes related to the object 'sky' may include, without limitation, color of the sky, intensity and visibility of the sky. The 'color' attribute may take multiple values such as light black, pitch dark, blue, deep blue and the like. Also, the 'intensity' may have multiple values based on brightness level of the sky. Similarly, the 'visibility' attribute may have further distinctions such as clear, partially clear, cloudy, twilight, and the like.

In an embodiment, the scene context descriptor 113 may be generated by correlating the audio context descriptor 111 of the one or more scenes 105 with the scene descriptor 107 of each of the one or more scenes 105. The process of correlating the scene descriptor 107 with the audio context descriptor 111 may involve comparing attributes of each objects indicated in the audio context descriptor 111 with the attributes of objects indicated in the scene descriptor 107. For example, the attributes of object 'Sky' specified in the audio context descriptor 111 may be compared with the attributes of the same object, i.e. 'Sky', specified in the scene descriptor 107 for determining deviation in the context of the object 'Sky'.

Consider a scenario in which the scene descriptor 107 of a scene indicates color of the sky as 'Blue', and the corresponding audio context descriptor 111 indicates that color of sky as 'Red'. In this scenario, the scene context descriptor 113, generated by correlating the scene descriptor 107 and the audio context descriptor 111, may suggest translation of the color of sky from 'Blue' to 'Red', in order to transform the one or more scenes 105 according to context of the one or more speech segments.

In an embodiment, each of the data 207 stored in the video transformation system 103 may be processed by one or more modules 209 of the video transformation system 103. In one implementation, the one or more modules 209 may be stored as a part of the processor 203. In another implementation, the one or more modules 209 may be communicatively coupled to the processor 203 for performing one or more functions of the video transformation system 103. The modules 209 may include, without limiting to, a scene extraction module 213, a scene descriptor generation module 215, a textual descriptor generation module 217, an audio context determination module 219, a correlation module 221, a scene translation module 223 and other modules 225.

As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. In an embodiment, the other modules 225 may be used to perform various miscellaneous functionalities of the video transformation system 103. It will be appreciated that such modules 209 may be represented as a single module or a combination of different modules.

In an embodiment, the scene extraction module 213 may be responsible for recognizing the one or more scenes 105 from the video 102. Each of the one or more scenes 105 may include, without limitation, one or more objects, actions performed by the objects and the background in which the objects are placed. In an embodiment, the scene extraction module 213 may be configured with predetermined computer vision techniques and deep learning techniques, along with labelled training datasets, for recognizing the one or more scenes 105.

In an embodiment, the scene descriptor generation module 215 may be used for generating the scene descriptor 107 for each of the one or more scenes 105 corresponding to the video 102. In an implementation, subsequent to generating the scene descriptor 107 for each of the one or more scenes 105, the scene descriptor generation module 215 may compare the scene descriptor 107 of each of the one or more scenes 105 for eliminating one or more duplicate/redundant scenes, whose scene descriptors 107 are same and/or closely related.

In an embodiment, relevance or difference among the one or more scenes 105 may be quantified by computing divergence between the scene descriptors 107 of two consecutive scenes. In an embodiment, if the divergence is less than a predetermined threshold, then one of the two consecutive scenes may be considered for discarding. For example, consider four consecutive scenes A, B, C and D. Suppose, the scenes B and C are close to each other. Here, to decide which of the scenes B and C is to be discarded, the divergence/distance between the scenes A and B and scenes C and D may be computed. If scene B is identified to be closer to scene A than scene C to scene D, then scene B may be discarded. Else, scene C may be discarded. Thus, the one or more scenes 105 having identical scene descriptors 107 may be excluded from further processing.

In an embodiment, the textual descriptor generation module 217 may be used for generating the textual descriptor 109 for each of the one or more scenes 105. Initially, the textual descriptor generation module 217 may identify each of the one or more audio signals in the video 102. Then, the textual descriptor generation module 217 may segregate each of the one or more audio signals into the one or more speech segments and the one or more non-speech segments. Subsequently, the textual descriptor generation module 217 may translate each of the one or more speech segments into corresponding one or more text segments. Finally, each of the one or more text segments may be analyzed to determine one or more context based keywords in the one or more text segments.

In an embodiment, the audio context determination module 219 may be used for determining an audio context descriptor 111 based on semantic analysis of the textual descriptor 109 of each of the one or more speech segments. For example, consider an exemplary context—color of sky in the night (i.e. Black). Suppose, the speech segment related to the aforesaid context is a sentence such as—'The twinkling stars are so beautiful'. Here, in order to establish a match between the context of the audio and the corresponding scene, the scene descriptor 107 must apply 'Black' color to the sky in the background of the scene. Similarly, when the speech segment points to a sentence such as—'It is too sunny', the color of sky in the background of the scene must be changed to 'Blue'. Thus, as illustrated above, the audio context descriptor 111 may be useful for deciding an appropriate transformation to be applied on the one or more scenes 105 of the video 102.

In an embodiment, the correlation module 221 may be used for generating the scene context descriptor 113 for each of the one or more scenes 105 by correlating the audio context descriptor 111 with the scene descriptor 107. In an embodiment, the correlation module 221 may validate coherency between the audio context descriptor 111 and the scene descriptor 107, by comparing attributes of each object, being referenced in the one or more speech segments, with the attributes of each object present in each of the one or more scenes 105. Further, the scene context descriptor 113 may be generated based on the correlation mapping/coherence between the audio context descriptor 111 and the scene descriptor 107.

In an embodiment, the scene context descriptor 113 may be helpful in choosing a right set of attributes to be transformed in the video 102. For example, if the scene context descriptor 113 corresponding to one of the one or more scenes 105 related to sunset, then the color of sky in the successive scene must be translated to 'Red'. In an embodiment, the process of translating each of the one or more scenes 105 based on the scene context descriptor 113, for transforming the video 102, may be performed by the scene translation module 223. In an embodiment, translating each of the one or more scenes 105 may include changing one or more attributes such as, color of the one or more scenes 105, sequence of rendering the one or more scenes 105 to the user, and the like. Further, the transformed video 115 may be dynamically rendered to the user through a user interface (not shown in FIG. 2) associated with the video transformation system 103.

Illustrative Scenario:

The working and/or application of the method of present disclosure may be better understood with the help of following exemplary scenario. It shall be noted that the exemplary scenario illustrated herein is for the purpose of better understanding only, and should not be construed as a limitation to the invention.

Figure 3A:
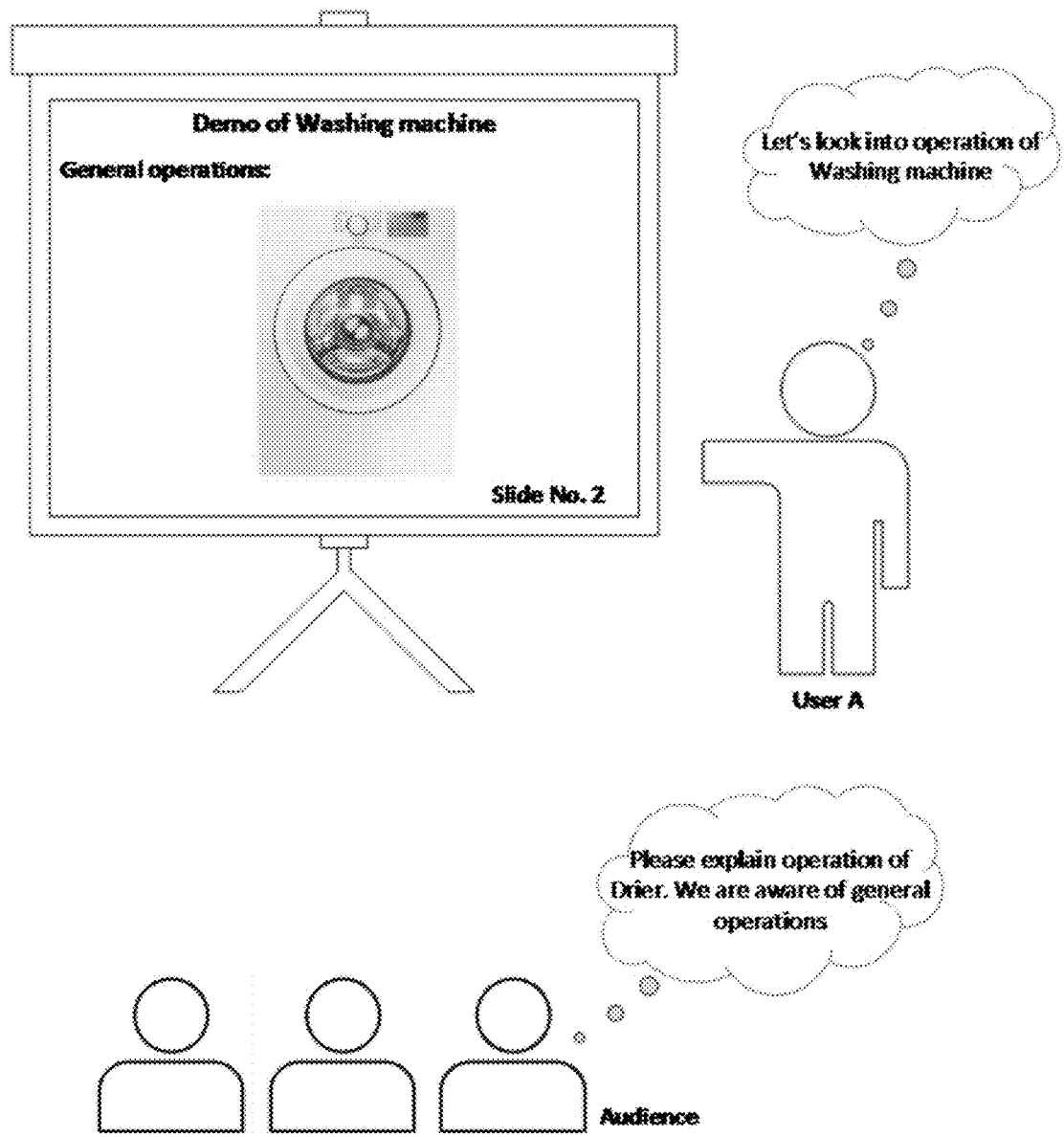
FIG. 3A and FIG. 3B illustrate an exemplary embodiment of a method for performing context-based transformation of a video in accordance with the present disclosure.

As shown in FIG. 3A, consider a user 'A', who is giving a product demo on usage of washing machine. Suppose, at the start of demo, 'A' says 'Let's look into operation of Washing machine' and starts explaining general operation of the washing machine with the help of 'Slide No. 2' of the presentation. However, while the user 'A' is still presenting, suppose 'A' gets interrupted by an audience (online or offline), who claims that he is already aware of the general operations of the washing machine, and asks 'A' to forward the explanation to the working of 'drier' in the washing machine.

Figure 3B:
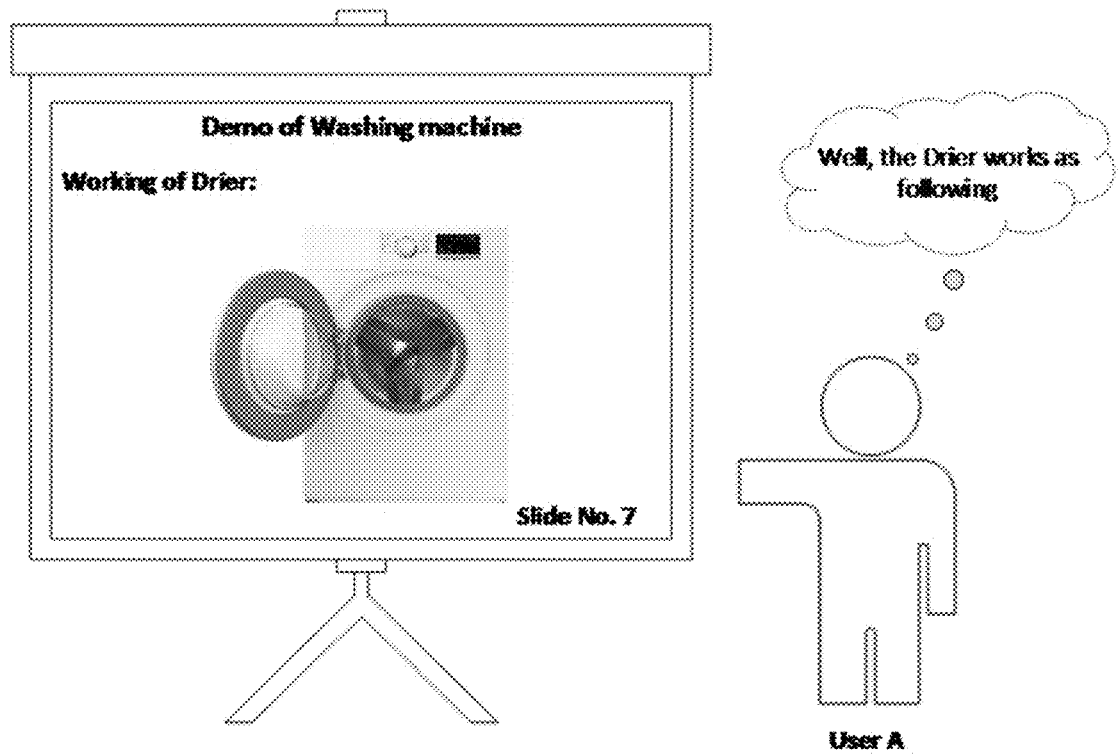

In such scenario, 'A' need not struggle with changing the sequence of presentation and/or demo video back and forth. Instead, as shown in FIG. 3B, 'A' may directly jump to the part of explanation that explains operation of the 'Drier' by saying, for example, 'Well, the drier works as following'. As soon as 'A' utters the above sentence, the sequence of the presentation/video jumps to current context of the A's explanation (i.e. working of drier) and the presentation/video will be rendered from 'Slide No. 7', which explains operation of the 'Drier'. Thus, both the presenter (i.e. user 'A') and the audience are saved from distraction.

In the above scenario, the sequence of presentation/video may have stored attributes related to operation of the drier, and its link as a scene descriptor 107 for the sequence of presentation/video. Further, the stored scene descriptor 107 may get invoked contextually when the context of the audio signals (i.e. A's explanation of the presentation/video) has changed, thereby leading to a transformation in the presentation/video being rendered to the audience.

Lately, suppose 'A' is explaining about procedures for organic farming of orange trees. Suppose 'A' is telling about watering orange plants during rainy season. Here, the plants in the video may be represented with green leaves. However, when 'A' is interrupted and asked to explain the process during autumn, the video may be instantly transformed to represent yellow leaves on the orange plants. Here, the attributes such as color of leaves (i.e. Green or Yellow) may be tagged in conjunction with attributes of the seasons (i.e. Rainy season or Autumn season), and may be stored in the video as the scene context descriptor for the video.

Figure 4:
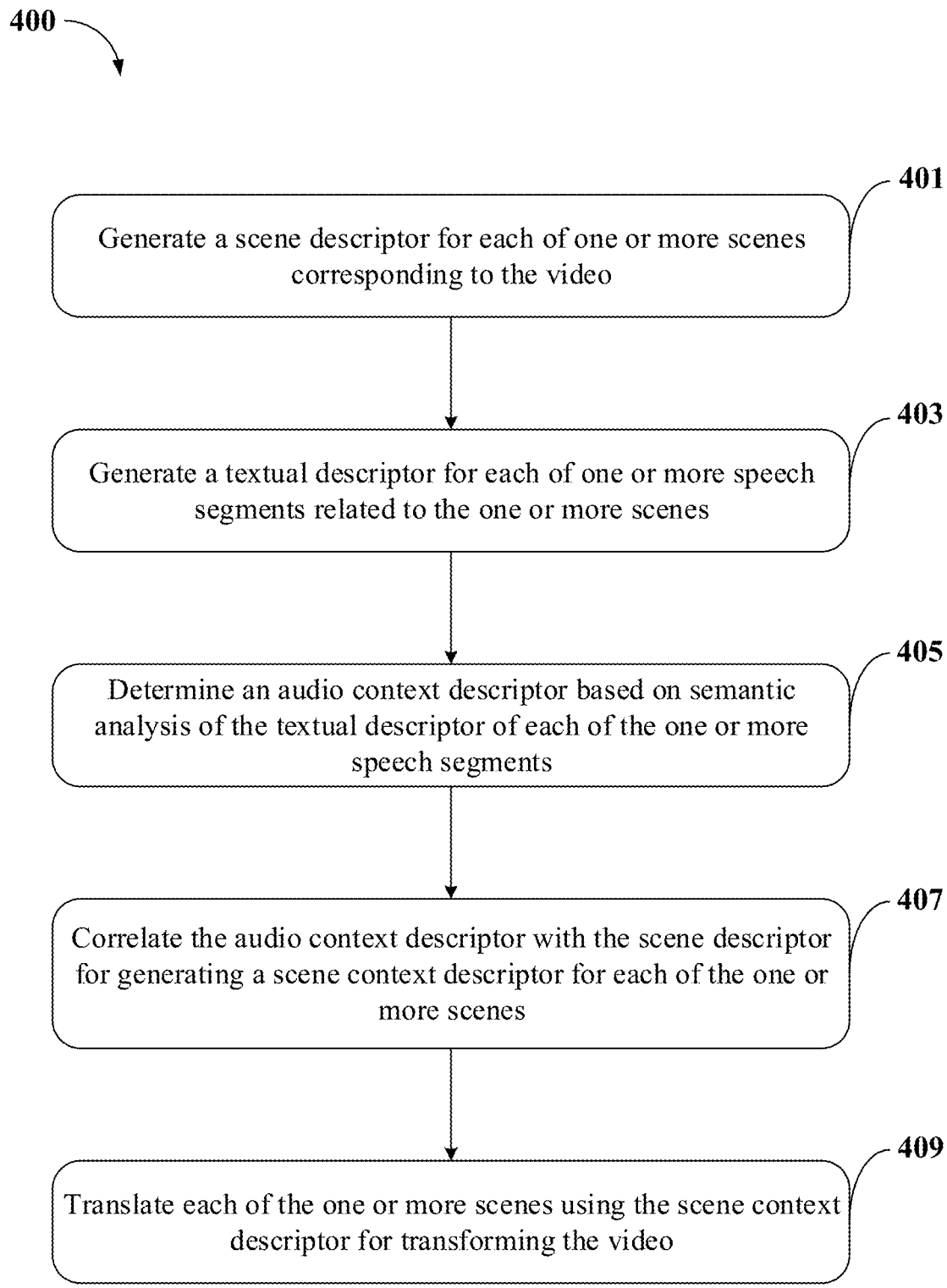
FIG. 4 shows a flowchart illustrating a method of performing context-based transformation of a video in accordance with some embodiments of the present disclosure.

FIG. 4 shows a flowchart illustrating a method of performing context-based transformation of a video 102 in accordance with some embodiments of the present disclosure.

As illustrated in FIG. 4, the method 400 includes one or more blocks illustrating a method of performing context-based transformation of a video 102 using a video transformation system 103 for example, the video transformation system 103 shown in FIG. 1. The method 400 may be described in the general context of computer executable instructions. Generally, computer executable instructions can include routines, programs, objects, components, data structures, procedures, modules, and functions, which perform specific functions or implement specific abstract data types.

The order in which the method 400 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 401, the method 400 includes generating, by the video transformation system 103, a scene descriptor 107 for each of one or more scenes 105 corresponding to the video 102. In an embodiment, the one or more scenes 105 are obtained by converting the video 102 into one or more frames. Further, the video transformation system 103 may include eliminating one or more redundant scenes corresponding to the video 102 upon detecting similar scene descriptor 107 for the one or more scenes 105.

In an embodiment, scene descriptor 107 may be generated using one or more parameters comprising objects present in the one or more scenes 105, actions performed by the objects, and attributes of background of the objects in the one or more scenes 105. Further, the scene descriptor 107 may include labels and description for objects present in the one or more scenes 105.

At block 403, the method 400 includes generating, by the video transformation system 103, a textual descriptor 109 for each of one or more speech segments related to the one or more scenes 105. In an embodiment, generating the textual descriptor 109 may include translating each of the one or more speech segments into corresponding textual data using a speech-to-text conversion technique preconfigured in the video transformation system 103.

At block 405, the method 400 includes determining, by the video transformation system 103, an audio context descriptor 111 based on semantic analysis of the textual descriptor 109 of each of the one or more speech segments. In an embodiment, the audio context descriptor 111 may indicate one or more context-based elements in the one or more scenes 105 corresponding to the video 102.

At block 407, the method 400 includes correlating, by the video transformation system 103, the audio context descriptor 111 with the scene descriptor 107 for generating a scene context descriptor 113 for each of the one or more scenes 105. As an example, the scene context descriptor 113 may indicate a context of the one or more scenes 105, with respect to the sequence of the video 102, along with the audio signals corresponding to the context of the one or more scenes 105.

At block 409, the method 400 includes translating, by the video transformation system 103, each of the one or more scenes 105 using the scene context descriptor 113 for transforming the video 102. In an embodiment, translating each of the one or more scenes 105 may include changing one or more attributes such as, color of the one or more scenes 105, sequence of rendering the one or more scenes 105 to the user, and the like.

Computer System

Figure 5:
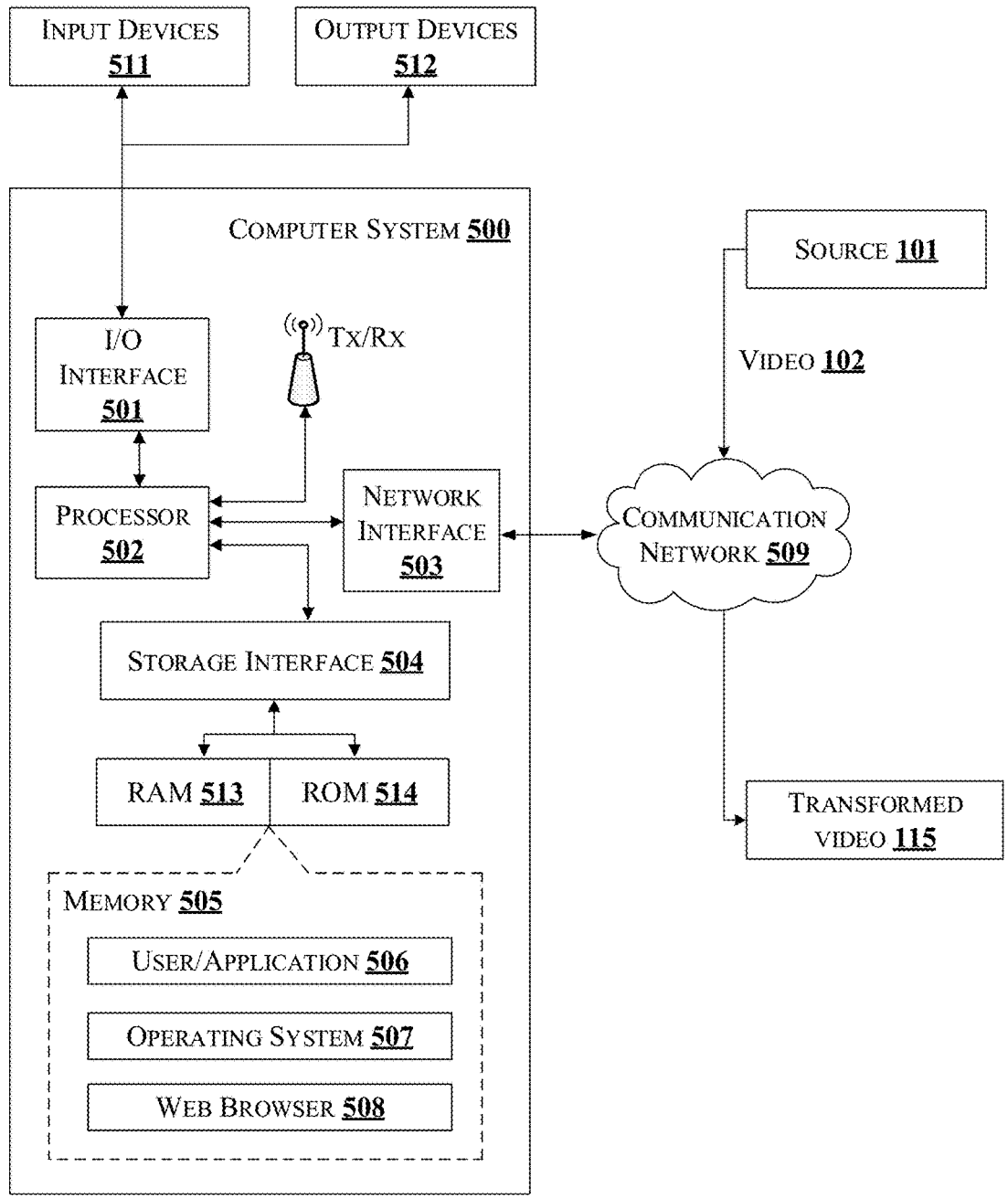
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be video transformation system 103 shown in FIG. 1, which may be used for performing context-based transformation of a video 102. The computer system 500 may include a central processing unit ("CPU" or "processor") 502. The processor 502 may comprise at least one data processor for executing program components for executing user- or system-generated business processes. A user may include a person, a user in the computing environment 100, or any system/sub-system being operated parallel to the computer system 500. The processor 502 may include specialized processing units such as integrated system (bus) controllers, memory management control units, floating point units, graphics processing units, digital signal processing units, etc.

The processor 502 may be disposed in communication with one or more input/output (I/O) devices (511 and 512) via I/O interface 501. The I/O interface 501 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc. Using the I/O interface 501, the computer system 500 may communicate with one or more I/O devices 511 and 512. In some implementations, the I/O interface 501 may be used to connect to a user device, such as a smartphone, a laptop, or a desktop computer associated with the user, through which the user may input the video 102 to be transformed by the video transformation system 103.

In some embodiments, the processor 502 may be disposed in communication with a communication network 509 via a network interface 503. The network interface 503 may communicate with the communication network 509. The network interface 503 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 503 and the communication network 509, the computer system 500 may receive the video 102 to be transformed from a source 101. Similarly, the computer system 500 may use the communication network 509 for rendering the transformed video 115 to the user.

In an implementation, the communication network 509 can be implemented as one of the several types of networks, such as intranet or Local Area Network (LAN) and such within the organization. The communication network 509 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 509 may include a variety of network devices, including routers, bridges, servers, computing devices, storage devices, etc.

In some embodiments, the processor 502 may be disposed in communication with a memory 505 (e.g., RAM 513, ROM 514, etc. as shown in FIG. 5) via a storage interface 504. The storage interface 504 may connect to memory 505 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user/application interface 506, an operating system 507, a web browser 508, and the like. In some embodiments, computer system 500 may store user/application data 506, such as the data, variables, records, etc. as described in this invention. Such databases may be implemented as fault-tolerant, relational, scalable, secure databases such as Oracle® or Sybase®.

The operating system 507 may facilitate resource management and operation of the computer system 500. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPEN-BSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like.

The user interface 506 may facilitate display, execution, interaction, manipulation, or operation of program components through textual or graphical facilities. For example, the user interface 506 may provide computer interaction interface elements on a display system operatively connected to the computer system 500, such as cursors, icons, check boxes, menus, scrollers, windows, widgets, and the like. Further, Graphical User Interfaces (GUIs) may be employed, including, without limitation, APPLE® MACINTOSH® operating systems' Aqua®, IBM® OS/2®, MICROSOFT® WINDOWS® (e.g., Aero, Metro, etc.), web interface libraries (e.g., ActiveX®, JAVA®, JAVASCRIPT®, AJAX, HTML, ADOBE® FLASH®, etc.), or the like.

The web browser 508 may be a hypertext viewing application. Secure web browsing may be provided using Secure Hypertext Transport Protocol (HTTPS), Secure Sockets Layer (SSL), Transport Layer Security (TLS), and the like. The web browsers 508 may utilize facilities such as AJAX, DHTML, ADOBE® FLASH®, JAVASCRIPT®, JAVA®, Application Programming Interfaces (APIs), and the like. Further, the computer system 500 may implement a mail server stored program component. The mail server may utilize facilities such as ASP, ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 500 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, and the like.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Advantages of the Embodiment of the Present Disclosure are Illustrated Herein

In an embodiment, the present disclosure discloses a method for dynamically transforming a video based on context of one or more audio signals in the video using deep learning techniques.

In an embodiment, the method of present disclosure is capable of automatically changing one or more attributes, such as color of the one or more scenes, in response to changes in the context of the audio corresponding to the video.

In an embodiment, the method of present disclosure is capable of dynamically changing sequence of rendering a video and/or a presentation based on changes in context of speech/utterances of a presenter, and thereby enhances impact of the video and/or the presentations on the viewers/users.

In an embodiment, the video transformation system and the method of present disclosure may be used for effective narration of a recorded content in various scenarios such as product demos, educative trainings, troubleshoot manuals, entertainment, and the like.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it will be clear that more than one device/article (whether they cooperate) may be used in place of a single device/article. Similarly, where more than one device or article is described herein (whether they cooperate), it will be clear that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for performing context-based transformation of a video, the method comprising:
generating, by a video transformation system, a scene descriptor of each of one or more scenes of a video based on executing one or more of a computer vision technique or a deep learning technique to identify and associate one or more scene attributes with one or more scene objects;
generating, by the video transformation system, a textual descriptor based on executing a conversion technique on each of one or more speech segments extracted from audio signals in each of the one or more scenes;
determining, by the video transformation system, an audio context descriptor based on executing a semantic analysis of the textual descriptor to identify and associate one or more audio attributes with one or more of the audio objects;
correlating, by the video transformation system, the one or more audio attributes associated with one or more audio objects in the audio context descriptor with the one or more scene attributes associated with one or more scene objects in the scene descriptor to generate a scene context descriptor for at least one of the scenes; and
translating, by the video transformation system, the at least one of the scenes based on execution of a function based on the scene context descriptor to transform the video.

2. The method as claimed in claim 1 further comprises eliminating one or more redundant scenes corresponding to the video upon detecting a similarity in the scene descriptor between two or more of the scenes.

3. The method as claimed in claim 2, wherein the detecting is determined by quantifying divergence between the scene descriptor of two or more of the scenes.

4. The method as claimed in claim 1, wherein the generating the scene descriptor is further based on one or more parameters comprising actions performed by the scene objects, or attributes of background of the scene objects in the one or more scenes.

5. The method as claimed in claim 1, wherein the generating the scene descriptor further comprises generating labels and description for scene objects present in the one or more scenes.

6. A video transformation system for performing context-based transformation of a video, the video transformation system comprising:
a processor; and
a memory, communicatively coupled to the processor, wherein the memory stores processor-executable instructions, which on execution, cause the processor to:

generate a scene descriptor of each of one or more scenes of a video based on executing one or more of a computer vision technique or a deep learning technique to identify and associate one or more scene attributes with one or more scene objects;

generate a textual descriptor based on executing a conversion technique on each of one or more speech segments extracted from audio signals in each of the one or more scenes;

determine an audio context descriptor based on executing a semantic analysis of the textual descriptor to identify and associate one or more audio attributes with one or more of the audio objects;

correlate the one or more audio attributes associated with one or more audio objects in the audio context descriptor with the one or more scene attributes associated with one or more scene objects in the scene descriptor to generate a scene context descriptor for at least one of the scenes; and translate the at least one of the scenes based on execution of a function based on the scene context descriptor to transform the video.

7. The video transformation system as claimed in claim 6, wherein the processor eliminates one or more redundant scenes corresponding to the video upon determining similarity in the scene descriptor between two or more of the scenes.

8. The video transformation system as claimed in claim 7, wherein the processor quantifies divergence between the scene descriptor of two or more of the scenes to determine the similarity among the scene descriptor of the two or more scenes.

9. The video transformation system as claimed in claim 6, wherein the processor for the generate the scene descriptor is further based on one or more parameters comprising actions performed by the scene objects or attributes of background of the scene objects in the one or more scenes.

10. The video transformation system as claimed in claim 6, wherein the generate the scene descriptor further comprises generating labels and description for scene objects present in the one or more scenes.

11. A non-transitory computer readable medium having stored thereon instructions for performing context-based transformation of a video comprising executable code which when executed by one or more processors, causes the one or more processors to:

generate a scene descriptor of each of one or more scenes of a video based on executing one or more of a computer vision technique or a deep learning technique to identify and associate one or more scene attributes with one or more scene objects;

generate a textual descriptor based on executing a conversion technique on each of one or more speech segments extracted from audio signals in each of the one or more scenes;

determine an audio context descriptor based on executing a semantic analysis of the textual descriptor to identify and associate one or more audio attributes with one or more of the audio objects;

correlate the one or more audio attributes associated with one or more audio objects in the audio context descriptor with the one or more scene attributes associated with one or more scene objects in the scene descriptor to generate a scene context descriptor for at least one of the scenes; and translate the at least one of the scenes based on execution of a function based on the scene context descriptor to transform the video.

12. The medium as claimed in claim 11, wherein the executable code when executed by the one or more processors further causes the one or more processors to eliminate one or more redundant scenes corresponding to the video upon determining a similarity in the scene descriptor between two or more of the scenes.

13. The medium as claimed in claim 12, wherein the executable code when executed by the one or more processors further causes the one or more processors to quantify divergence between the scene descriptor of two or more of the scenes to determine the similarity among the scene descriptor of the two or more scenes.

14. The medium as claimed in claim 11, wherein the executable code when executed by the one or more processors further causes the one or more processors for the generate the scene descriptor is further based on one or more parameters comprising actions performed by the scene objects or attributes of background of the scene objects in the one or more scenes.

15. The medium as claimed in claim 11, wherein the generate the scene descriptor further comprises generating labels and description for scene objects present in the one or more scenes.

* * * * *